S. HENRY.
Tool-Handles.

No. 153,897. Patented Aug. 11, 1874.

Witnesses
Geo Gray
S. C. Hale

Stephen Henry
by his attorney
H. P. Hale

UNITED STATES PATENT OFFICE.

STEPHEN HENRY, OF MARSHFIELD, MASSACHUSETTS.

IMPROVEMENT IN TOOL-HANDLES.

Specification forming part of Letters Patent No. 153,897, dated August 11, 1874; application filed April 8, 1874.

*To all whom it may concern:*

Be it known that I, STEPHEN HENRY, of Marshfield, in the county of Plymouth and State of Massachusetts, have invented a new and useful Improvement in Tool-Handles, of which the following is a specification:

The accompanying drawing illustrates my invention.

Figure 1:
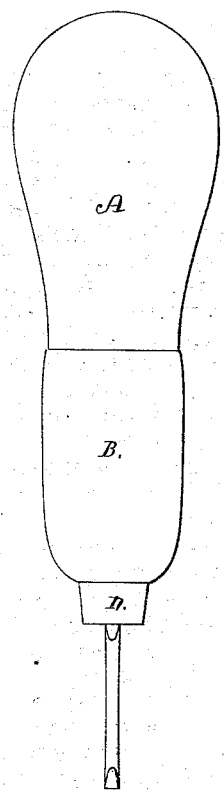
Figure 2:
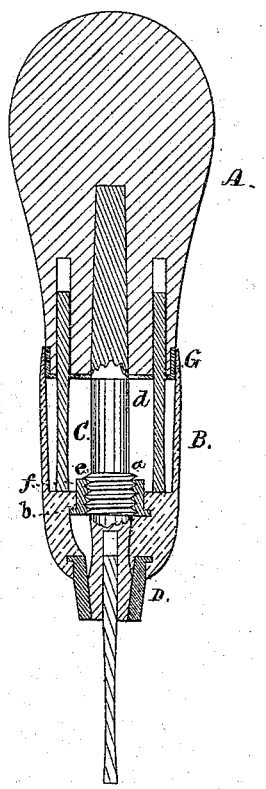

In such drawing, Figure 1 denotes a side elevation, and Fig. 2 a central and longitudinal section, of an awl-handle embodying my improvement.

This invention relates to that class of awl or tool handles having a split metallic shaft, in whose furcated end the shank of the awl or tool is inserted, and clamped therein by means of a tapering or conical sleeve, caused to impinge upon and compress the jaws or furcated end of the shaft; and my invention consists of the peculiar construction and arrangement of the several parts, as hereinafter described and claimed.

In the said drawing, A and B denote the two halves or parts of the handle, the part A being constructed of wood or other suitable material, and solid, and having the shank of the metallic furcated shaft C secured axially and rigidly therein. The part B is of a hollow conoidal shape, and formed of hard rubber, or any other suitable material, such part having a frusto-conic sleeve, D, formed on or firmly secured to one end thereof. The said furcated shaft has a male screw, a, cut on a boss, e, formed on the shaft and at a point just below its limit of furcation, as shown in Fig. 2, such screw operating with a female screw, b, secured to or formed in the lower part f of a chamber, d, made in the part B, as shown in said latter figure. The inner end of the part A has a metallic cap, g, disposed thereon. Within the upper end of the part A is a series of holes, which are disposed around its perimeter, the same serving to receive the shanks of a set of supernumerary awls or tools, the projecting ends of such tools extending into and being inclosed by the chamber d, which serves to maintain the tools in their proper positions.

From the above it will be seen, by the described construction and arrangement, that the parts A and B can readily be connected or disconnected by simply rotating the part B in the proper direction upon the part A, and that such, at the same time, clamps or unclamps the awl or tool.

I do not claim the inventions as shown and described in Letters Patent No. 6,261, 17,078, or 62,938.

Having described my invention, what I claim as an improvement on the patent granted to me on March 3, 1874, is—

The improved tool-handle, composed of the parts A and B, the part A being provided with a series of tool-receiving cavities, and the furcated shaft C rigidly secured thereto, the latter having a tapering outer end, and a cylindrical male screw, a, formed on the shaft, and the part B provided with the conical sleeve D, the cylindrical female screw b, and the chamber d, the whole being combined and arranged together in manner as shown, and so as to operate as set forth.

In testimony that I claim the foregoing I have hereunto set my signature this 13th day of March, A. D. 1874.

STEPHEN HENRY.

Witnesses:
F. P. HALE,
F. C. HALE.